United States Patent
Lei et al.

(10) Patent No.: US 10,989,524 B2
(45) Date of Patent: Apr. 27, 2021

(54) ASYMMETRIC OPTICAL INTERFERENCE MEASUREMENT METHOD AND APPARATUS

(71) Applicant: HUAIYIN NORMAL UNIVERSITY, Jiangsu (CN)

(72) Inventors: Feng Lei, Huaian (CN); Xintian Bian, Huaian (CN)

(73) Assignee: HUAIYIN NORMAL UNIVERSITY, Huaian (CN)

(*) Notice: Subject to any disclaimer, the term of this patent is extended or adjusted under 35 U.S.C. 154(b) by 0 days.

(21) Appl. No.: 16/326,848

(22) PCT Filed: May 27, 2017

(86) PCT No.: PCT/CN2017/086321
§ 371 (c)(1),
(2) Date: Feb. 20, 2019

(87) PCT Pub. No.: WO2018/072446
PCT Pub. Date: Apr. 26, 2018

(65) Prior Publication Data
US 2019/0186904 A1 Jun. 20, 2019

(30) Foreign Application Priority Data

Oct. 18, 2016 (CN) .......................... 201610907996.3

(51) Int. Cl.
*G01B 11/24* (2006.01)
*G01B 9/02* (2006.01)

(52) U.S. Cl.
CPC ........ *G01B 11/2441* (2013.01); *G01B 9/0209* (2013.01); *G01B 9/02015* (2013.01); *G01B 9/02044* (2013.01)

(58) Field of Classification Search
CPC ............ G01B 9/02015; G01B 9/02044; G01B 9/0209; G01B 11/2411; G01B 2290/35; G01B 2290/40
See application file for complete search history.

(56) References Cited

U.S. PATENT DOCUMENTS 3,661,463 A * 5/1972 Brainard ................ G05B 19/21
356/500
4,872,755 A * 10/1989 Kuchel .................... G01J 9/02
356/495

(Continued)

*Primary Examiner* — Dominic J Bologna
(74) *Attorney, Agent, or Firm* — Houtteman Law LLC

(57) ABSTRACT

An asymmetric optical interferometry method, comprises the following steps: an incident light is split into two beams, and the two beams are respectively projected onto a surface of an object to be tested and a reference mirror; and then respectively pass through a first imaging lens having a larger area on the side of the object, and a second imaging lens having a smaller area on the side of the reference mirror, and overlap on a photoelectric sensor after passing through a third imaging lens to form at least one interference image (S1); the corresponding interference image is input into a computer to obtain a signal of the corresponding interference image (S2); parse the signal of the corresponding interference image to obtain a three-dimensional shape (S3) of the surface of the object. Also provide an asymmetric optical interferometry device.

5 Claims, 5 Drawing Sheets

(56) References Cited

U.S. PATENT DOCUMENTS

2002/0179866 A1* 12/2002 Hoeller ............... G01B 11/005
                                                        250/559.33
2005/0134863 A1*  6/2005 De Lega ........... G01B 9/02039
                                                        356/512
2006/0262321 A1* 11/2006 De Groot ............ G01B 9/0209
                                                        356/503
2011/0043822 A1*  2/2011 Hamano ........... G01B 11/2441
                                                        356/515

* cited by examiner

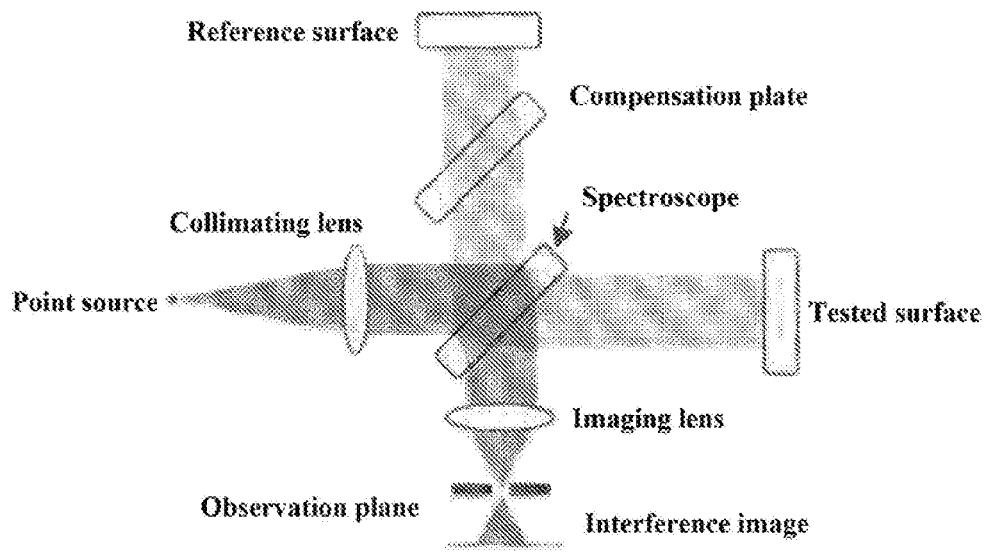

Fig. 1

| an incident light source is split into two beams via a spectroscope, and the two beams are respectively projected onto the surface of the object to be tested and the surface of the reference mirror, wherein testing light reflected by the surface of the object to be tested passes through a first imaging lens having a larger area on the side of the object to be tested, and reference light reflected by the surface of the reference mirror passes through a second imaging lens having a smaller area on the side of the reference mirror; and finally the testing light and the reference light overlap on an area-array camera photoelectric sensor after passing through a third imaging lens to form at least one interference image. | S1 |

↓

| a corresponding interference image is input into a computer to obtain a signal of the corresponding interference image | S2 |

↓

| the signal of the corresponding interference image is parsed by a phase shift algorithm or a white light interferometry method to obtain a three-dimensional shape of the surface of the object to be tested. | S3 |

Fig. 2

ASYMMETRIC OPTICAL INTERFERENCE MEASUREMENT METHOD AND APPARATUS

TECHNICAL FIELD

The present application relates to the technical field of precision optical measurement, and more particularly relates to an asymmetric optical interferometry method and device.

BACKGROUND ART

In recent years, with the advancement and development of precision manufacturing technology, the technology for detecting the surface shapes of objects has been widely used. Optical interferometry makes use of interference fringes generated by two light beams to accurately measure the three-dimensional shape and structure of the surface of an object. Thanks to its characteristics of non-contact measurement and high measurement accuracy, optical interferometry is widely used to measure the fine shape structure of 3D surface of precision industrial products such as semiconductor integrated circuits, flat panel display panels (LCD, PDP, EL), and MEMS substrates. It is a key supporting technology indispensable to the field of precision machining.

With the rapid development of computer data processing and automatic control technologies, great progresses have also been made in the optical interferometry technology. The NewView8000 developed by ZYGO of United States, the BW-5500 from Nikon of Japan, and the ContourGT-K from Bruker of Germany represent the current top level of three-dimensional optical precision measuring instruments. Such a measuring instrument is characterized by nanometer-level measurement accuracy, convenient operation, and fully functional application software. However, because such a measuring instrument adopts a symmetric optical interference system and a stepping scanning method, it also has such shortcomings as low measurement speed and limited measurement area.

When an optical interference system is symmetrical, it indicates that the testing optical system is symmetrical to the reference optical system. As shown in FIG. 1, which is a schematic diagram of the structure of a symmetrical optical interference system, if it is necessary to expand the testing area, it is also necessary to expand the reference area; high precision machining and assembly techniques are required, in order to design and process a reference mirror with a large area, resulting in the higher manufacturing cost; in addition, there are only few companies around the world which can make large-area reference mirror, making it difficult to popularly used in the field of precision machining. In view of this, it is urgent to develop an optical interferometry methods that can measure a large area with low cost, portable size and easily installation.

SUMMARY OF THE INVENTION

The present application is intended to solve technical problems of existing optical interferometry methods capable to measure large area such as high cost, large size and weight.

To address such problems, the technical solution of the present application provides an asymmetric optical interferometry method, which comprises the following steps that:

An incident light source is split into two beams via a beam splitter. The one beam passes through the first imaging lens with longer focus distance and forms a larger projection area on the surface of the object to be tested, and another beam passes through the second imaging lens with short focus distance and forms a smaller projection area on the surface of the reference mirror. The two beams are reflected by object and mirror surfaces respectively, forming the two images that overlap on a photoelectric sensor after passing through the third imaging lens. An interference image can be obtained if the optical path between the two paths is smaller than the coherence length of light source. The magnification of the optical system comprised by the first and the third imaging lens is smaller than that of the optical system comprised by the second and the third imaging lens.

The corresponding interference image is input into a computer to obtain a signal of the corresponding interference image;

The signal of corresponding interference image is analyzed to obtain a three-dimensional shape of the surface of the object to be tested by using the phase-shifting algorithms.

In the above-mentioned technical solution, a plurality of interference images can be formed on the photoelectric sensor by simultaneously adjusting the distance between the second imaging lens and the beam splitter, and maintaining the distance between the second imaging lens and the reference mirror unchanged, so as to adjust the optical path difference between the optical path on the side of the reference mirror and the one on the side of the object to be tested.

In the above-mentioned technical solution, a collimating lens, a right angle steering mirror and a 180-degree retroreflecting mirror are inserted between the second imaging lens and the reference mirror; the distance between the right angle steering mirror and the 180-degree retroreflecting mirror is adjusted, to compensate for the optical path difference between the optical path on the side of the reference mirror and the one on the side of the object to be tested. The optical path difference between two paths results from the different magnification of two optical systems comprised by the imaging lens L1 and L2, respectively.

In the above-mentioned technical solution, the photodetector is an area camera or other two array photoelectric sensors.

In the above-mentioned technical solution, the signal of the corresponding interference image is analyzed by a phase-shifting algorithm or a white light interferometry method.

The present application also provides an asymmetric optical interferometry device, which comprises the third imaging lens, a beam splitter, the first imaging lens having a long focus distance and an object on the side of the object to be tested; the third imaging lens, a beam splitter, the second imaging lens having a short focus distance and a reference mirror on the side of reference mirror, wherein the magnification of the optical system comprised by the first imaging lens and the third imaging lens is smaller than that of the optical system comprised by the second imaging lens and the third imaging lens; In the above-mentioned technical solution, the reference mirror is located at a back focal plane of the second imaging lens.

The present application provides an asymmetric optical interferometry method and device, which can measure the large area with simple structure. According to the asymmetric optical interferometry method and device, different magnifications are adopted, and a reference mirror with small-area is used to obtain the interference image of the surface of object with a large-area, and then the three-dimensional shape of the surface of the object to be tested is obtained by analyzing one or more interference images. The present application has the advantages of reasonable structure design, large measurement scope and low cost with good performance.

BRIEF DESCRIPTION OF THE DRAWINGS

FIG. 1 is a structure schematic diagram of a symmetric optical interference system;

FIG. 2 is a flow diagram of an asymmetric optical interferometry method provided by the present application;

DETAILED DESCRIPTION OF PREFERRED EMBODIMENTS

The present application provides an asymmetric optical interferometry method and device, which has simple portable structure and can measure the area with a diameter up to 1000 mm. Because the different magnifications are adopted in the optical imaging system in the test and reference arm of asymmetric interferometry, it is possible to obtain an interference image of the surface of object with a large area by using reference mirror with small area, and then the three-dimensional shape of the surface of the object is obtained based on one or more interference images. The present application can measure a large area with low cost, portable size and easily installation, having the performance as the one named as VeriFire Atz that had been developed by famous Zygo cororpration. The present application is described in detail below in conjunction with the drawings and specific implementation mode.

Figure 3:
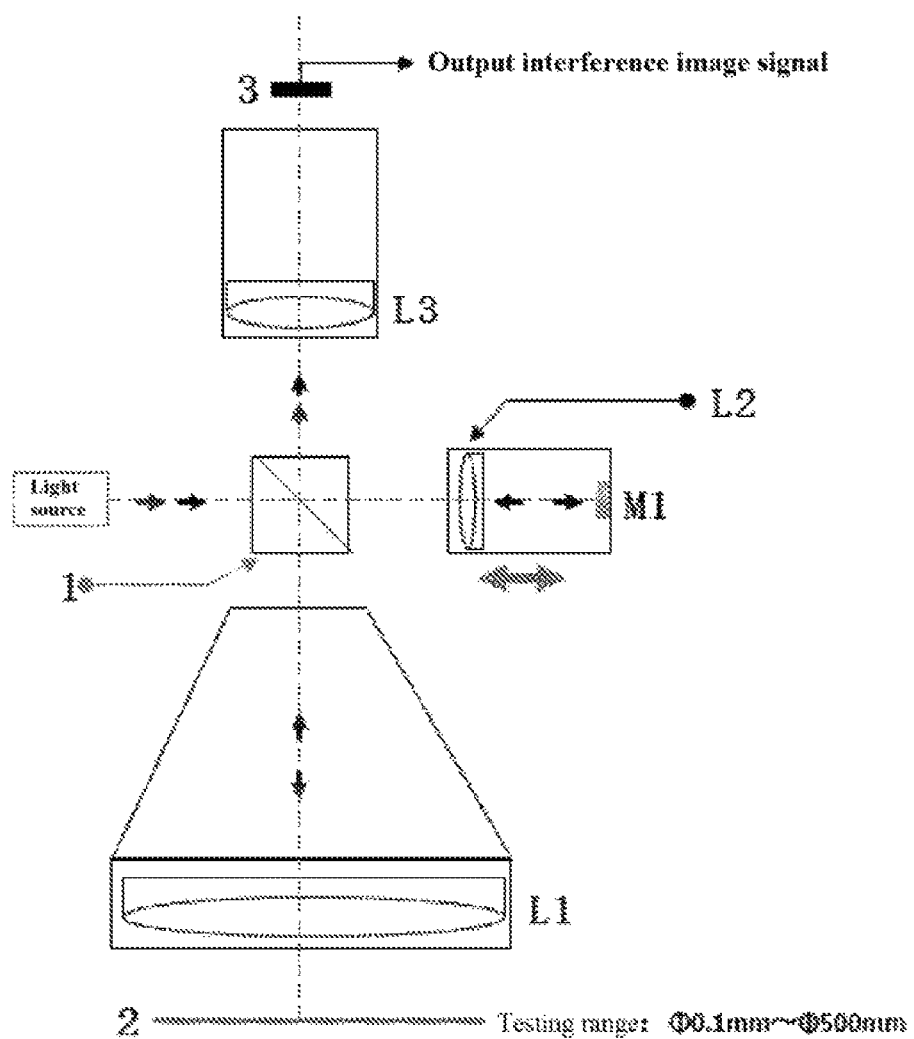
FIG. 3 is a structure schematic diagram of an asymmetric optical interferometry device.

The invention provides an asymmetric optical interferometry method, as shown in FIG. 2, comprising the following steps that:

S1. an incident light source is split into two beams, namely a testing light and a reference light, via a beam splitter (beam splitter), and the two beams are respectively projected onto the surface of an object to be tested and the surface of a reference mirror by the imaging lens L1 and L2 respectively (as shown in FIG. 3), wherein the testing light reflected by the surface of the object to be tested passes through a first imaging lens L1 and the third imaging lens L3, forming the image of surface of object with a larger area, and the reference light reflected by the surface of the reference mirror passes through a second imaging lens L2 and the third imaging lens L3, forming the image of surface of the reference mirror with a smaller area; the two images coincide on the back focal plane of the third imaging lens L3, forming an interference image that are captured by a photoelectric sensor.

The magnification of the optical system comprised by the first L1 and the third L3 imaging lens is smaller than that of the optical system comprised by the second L2 and the third L3 imaging lens.

S2. the corresponding interference image is input into a computer to obtain a signal of the corresponding interference image;

S3. the signal of the corresponding interference image is analyzed by using a phase shift algorithm or a white light interferometry method to obtain a three-dimensional shape of the surface of the object to be tested.

A plurality of interference images can be formed on the photoelectric sensor, by simultaneously adjusting the distance between the second imaging lens and the beam splitter, while maintaining the distance between the second imaging lens and the reference mirror unchanged, so as to alter the optical path difference between the reference arm and test arm of asymmetric interferometry.

A collimating lens, a right angle steering mirror and a 180-degree retroreflecting mirror are inserted between the second imaging lens and the reference mirror; the distance between the right angle steering mirror and the 180-degree retroreflecting mirror is adjusted, to compensate for the optical path difference between he reference arm and test arm of asymmetric interferometry.

Embodiment 1

Embodiment 1 of the present application provides an asymmetric optical interferometry device, as shown in FIG. 3, including a beam splitter 1, an object to be tested 2, a first imaging lens L1 having long focus distance, and a reference mirror M1 (located at the back focal plane of the second imaging lens L2), a second imaging lens L2 having a smaller focus distance compared to the first imaging lens L1, a third imaging lens L3, and an area-array camera photoelectric sensor 3. The magnification of the optical system comprised by the first L1 and the third L3 imaging lens is smaller than that of the optical system comprised by the second L2 and the third L3 imaging lens; an incident light source (a light source with a high coherence such as laser light) is split into two beams, namely the testing light and the reference light, by the beam splitter 1, and the two beams are respectively projected onto the surface of the object to be tested 2 and the surface of the reference mirror M1, wherein the testing light reflected by the surface of the object to be tested 2 passes through the first imaging lens L1, and the reference light reflected by the surface of the reference mirror M1 passes through the second imaging lens L2; and finally the testing light and the reference light coincide on the area-array camera photoelectric sensor after passing through the third imaging lens L3 to form one interference image.

The optical system comprised by first imaging lens L1 on the side of the object to be tested 2 and the third imaging lens L3 has a small magnification, allowing the surface of object with the large-area to be imaged onto the surface of the area-array camera photoelectric sensor 3, and conversely, the optical system comprised by the second imaging lens L2 and the third imaging lens L3 has a large magnification, and the surface of the reference mirror M1 with small-area can be imaged onto the surface of the area-array camera photoelectric sensor 3. Because an image of the surface of the object to be tested 2 and an image of the surface of the reference mirror M1 are completely overlapped on the surface of the area-array camera photoelectric sensor 3, an interference image can be formed on the surface of the area-array camera photoelectric sensor 3. In a word, the interference image of an object with large area can be obtained by using the reference mirror with relative smaller area.

Embodiment 2

Figure 4:
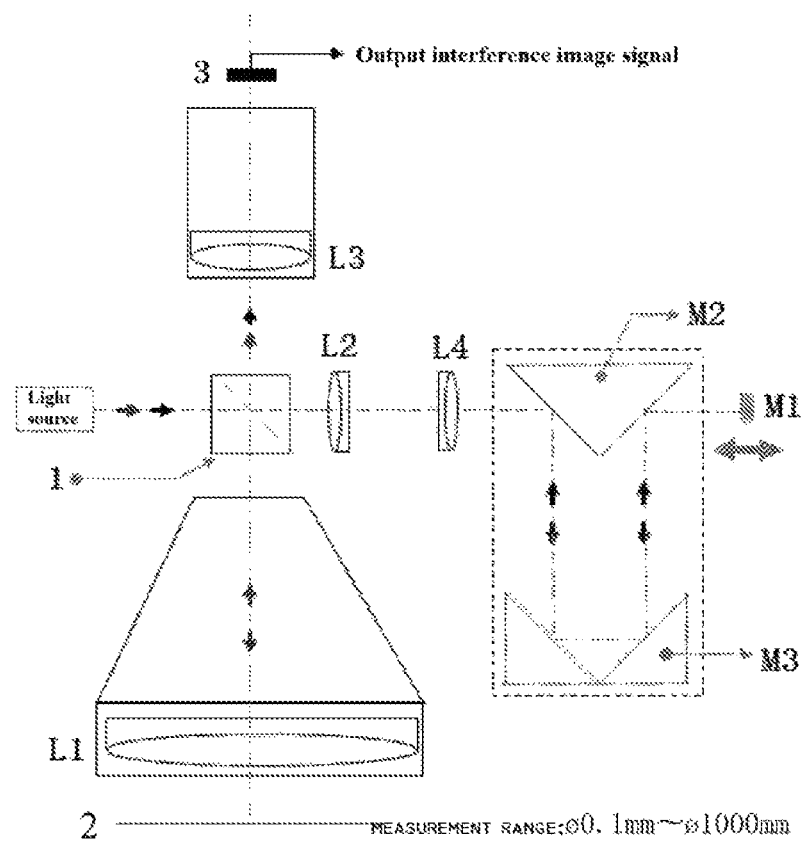
FIG. 4 is a structure schematic diagram of an asymmetric optical interferometry device with an optical path adjusting system. The optical path adjusting system is used to guarantee that the optical paths along test and reference arms of asymmetric interferometry have almost the same values.

By further optimizing the embodiment 1, embodiment 2 provides an asymmetric optical interferometry device, which may use a light source with high coherence such as laser as an incident light source, or a light source with lower coherence such as halogen white light. As shown in FIG. 4, it includes a beam splitter 1, an object to be tested 2, a first imaging lens L1 having long focus distance, and a second imaging lens L2 having a smaller focus distance compared to the first imaging lens L1, the collimator lens L4, a right angle steering mirror M2, and an 180-degree retroreflecting mirror M3, a third imaging lens L3 and an area-array camera photoelectric sensor 3.

The right angle steering mirror M2 and the 180-degree retroreflecting mirror M3 are configured between the collimating lens L4 and the reference mirror M1, the distance between the right angle steering mirror M2 and the 180-degree retroreflecting mirror M3 is adjusted to compensate for the optical path difference between the optical path on the side of the reference mirror M1 and the optical path on the side of the object to be tested 2 due to a fact that asymmetric imaging systems are used in two arms of interferometry. If the distance between the object to be tested 2 and the first imaging lens L1 is increased, the measurement range of the object to be tested 2 as well as and the optical path on the side of the object to be tested 2 will also be increased. Therefore, it is necessary to ensure that the optical path on the side of the object to be tested 2 and the optical path on the side of the reference mirror M1 are the same, in order to achieve large-area interference imaging of a low coherence light source.

The implementation of the asymmetric optical interferometry method provided by the present application is described below by using a semiconductor laser source as an incident light source. The center wavelength of the used semiconductor laser source is 670 nm, and the output power is 0.8 MW. The reference mirror M1 has a diameter of 3.15 mm and surface precision of $\lambda/20$ (@633 nm); the magnification of optical imaging system on the side of the reference mirror M1 is 1.0; the object to be tested 2 is flat glass, with a diameter of 45.0 mm; the magnification of optical imaging system on the side of the object to be tested is 0.07, the used area-array sensor photoelectric sensor is an area-array CCD industrial camera produced by Opteon Corporation of the United States.

Figure 5:
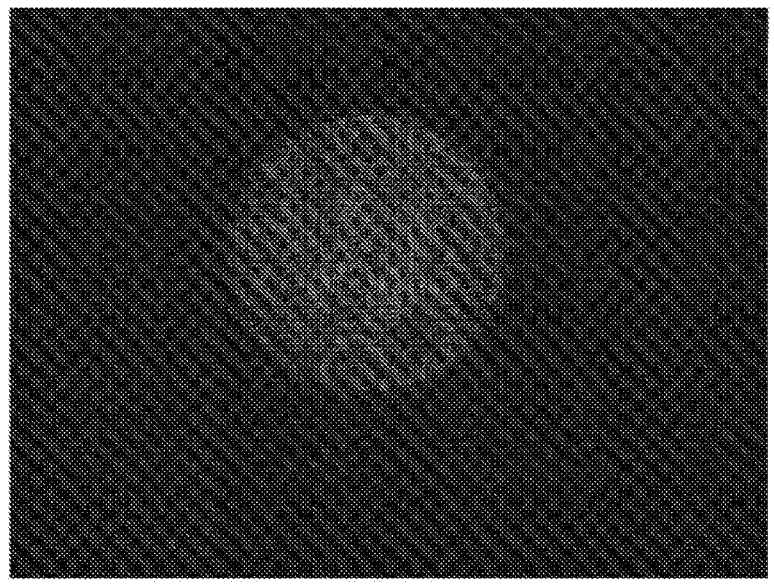
FIG. 5 is an image of a reference mirror M1 surface formed by optical imaging system comprised by lens L2 and L3 Lens. The size of surface is about ϕ3.15 mm, and the magnification of optical imaging system is 1.0 in the reference arm.
Figure 6:
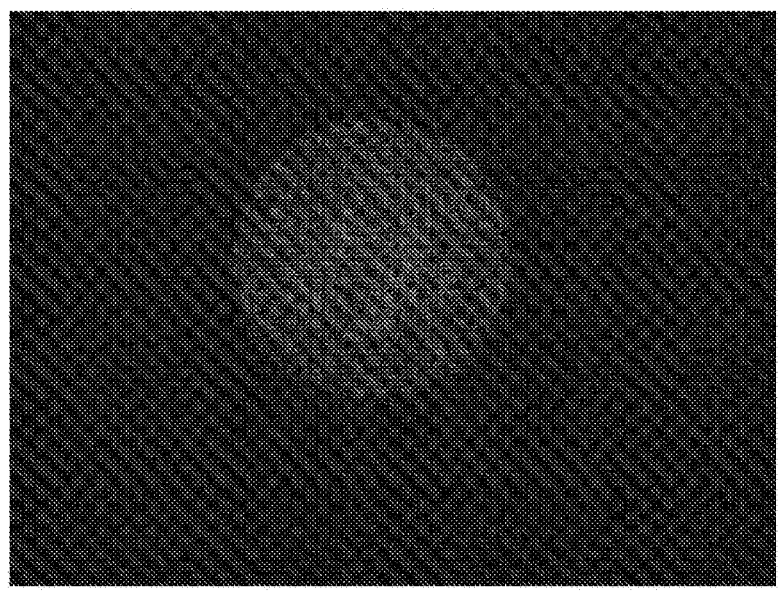
FIG. 6 is an image of an object surface to be tested 2 formed by optical imaging system comprised by lens L2 and L3 Lens. The size of surface is about ϕ45.0 mm, and the magnification of optical imaging system is 0.07 in the test arm.
Figure 7:
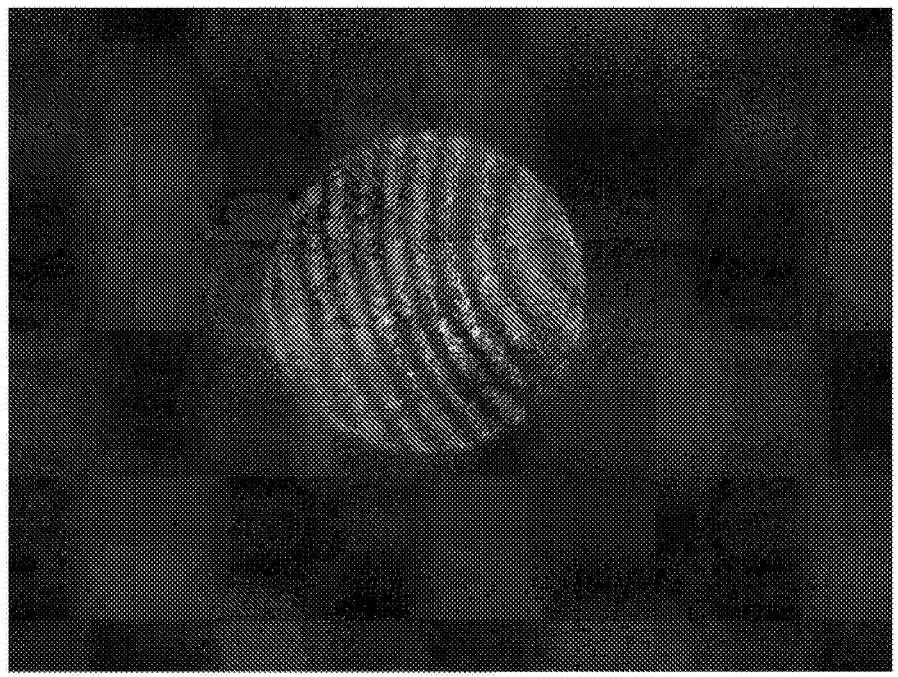
FIG. 7 is an interference image formed by asymmetric optical interferometry with the two different magnifications as 1.0 in reference arm and 0.07 in the test arm, respectively.

FIG. 5 illustrates the image of the reference mirror M1 formed by using the measuring instrument on the side of the reference mirror M1 alone; FIG. 6 shows the image of the object to be tested 2 formed by using the measuring instrument on the side of the object to be tested 2 alone. FIG. 7 illustrates the interference image formed by using the measuring instruments on both the side of the reference mirror M1 and the side of the object to be tested 2.

It can be seen from FIG. 5 and FIG. 6 that by using two different magnifications, the two images formed on reference mirror side and the object side have the same size on the surface of the area-array CCD industrial camera; as can be seen from FIG. 7, if the measuring instruments on both the side of the reference mirror M1 and the side of the object 2 are used simultaneously, the two images will overlap on the surface of the area-array CCD industrial camera to form an interference image.

The present application is not limited to the above-mentioned preferred embodiments, and any structural variations made by anyone inspired by the present application and forming technical solutions the same as or similar to those of the present application shall fall within the scope of protection of the present application.

The invention claimed is:

1. An asymmetric optical interferometry method, comprising the following steps of:
    splitting an incident light source into a first beam and a second beam via a beam splitter, the first beam passing through a first imaging lens and projecting on a surface of an object to be tested, and the second beam passing through a second imaging lens and projecting on a surface of a reference mirror, wherein the first imaging lens has a focus distance longer than that of the second imaging lens, and a projection area projected by the first beam on the surface of the object to be tested is larger than that of a projection area projected by the second beam on the surface of the reference mirror, wherein the surface of the object to be tested has an area larger than that of the surface of the reference mirror;
    the surface of the object to be tested and the surface of the reference mirror reflecting the first beam and the second beam, respectively, the first beam passing through the first imaging lens and a third imaging lens and forming a first image, the second beam passing through the second image lens and the third imaging lens and forming a second image, the first image and the second image coincide on a back focal plane of the third imaging lens and forming an interference image being captured by a photoelectric sensor, a magnification of a first optical system composed of the first and the third imaging lens is smaller than that of a second optical system composed of the second and the third imaging lens;
    inputting the interference image into a computer to obtain a signal of the interference image;
    analyzing the signal of the interference image to obtain a three-dimensional shape of the surface of the object to be tested by using the phase-shifting algorithms; and
    forming a plurality of interference images on the photoelectric sensor, by simultaneously adjusting a distance between the second imaging lens and the beam splitter, while maintaining a distance between the second imaging lens and the reference mirror unchanged, so as to alter an optical path difference between an optical path on the side of the reference mirror and an optical path on the side of the object to be tested;
    wherein, a collimating lens, a right angle steering mirror and a 180-degree retroreflecting mirror are inserted between the second imaging lens and the reference mirror; a distance between the right angle steering mirror and the 180-degree retroreflecting mirror is adjusted to compensate for the optical path difference between the optical path on the side of the reference mirror and the optical path on the side of the object to be tested, the optical path difference between two paths results from the different magnification of the first optical system composed of the first and the third imaging lens and the second optical system composed of the second and the third imaging lens.

2. An asymmetric optical interferometry method of claim 1, wherein the photoelectric sensor is an area-array camera photoelectric sensor.

3. An asymmetric optical interferometry method of claim 1, wherein the signal of the corresponding interference image is analyzed by a phase shift algorithm or a white light interferometry.

4. An asymmetric optical interferometric device, comprising:
- a beam splitter;
- an object to be tested;
- a first imaging lens having a long focal length on a side of the object to be tested;
- a reference mirror;
- a second imaging lens having a short focal length on a side of the reference mirror;
- a third imaging lens; and
- a photoelectric sensor, wherein a magnification of the first imaging lens is smaller than that of the second imaging lens;
- wherein the beam splitter is configured for splitting an incident light source into a first beam and a second beam, which are respectively projected onto a surface of the object to be tested and a surface of the reference mirror; the first beam and the second beam then respectively passes through the first imaging lens on the side of the object to be tested, and the second imaging lens on the side of the reference mirror, and coincide on a back focal plane of the third imaging lens and form an interference image captured by the photoelectric sensor;
- wherein a plurality of interference images are formed on the photoelectric sensor, by simultaneously adjusting a distance between the second imaging lens and the beam splitter, and a distance between the reference mirror and the beam splitter, and maintaining a distance between the second imaging lens and the reference mirror unchanged, so as to alter an optical path difference between an optical path on the side of the reference mirror and an optical path on the side of the object to be tested;
- wherein a collimating lens, a right angle steering mirror and a 180-degree retroreflecting mirror are inserted between the second imaging lens and the reference mirror; a distance between the right angle steering mirror and the 180-degree retroreflecting mirror is adjusted to compensate for the optical path difference between the optical path on the side of the reference mirror and the optical path on the side of the object to be tested due to changes made to the imaging position of the object to be tested.

5. An asymmetric optical interferometry device of claim 4, wherein the reference mirror is positioned at a back focal plane of the second imaging lens.

* * * * *